United States Patent
Bokhari et al.

(10) Patent No.: US 11,584,880 B2
(45) Date of Patent: Feb. 21, 2023

(54) AUTONOMOUS EXTREMOPHILES FOR DOWNHOLE OIL AND GAS APPLICATIONS CONTROLLED BY METAL SILICA NANOPARTICLES

(71) Applicant: SAUDI ARABIAN OIL COMPANY, Dhahran (SA)

(72) Inventors: Ameerah M. Bokhari, Dhahran (SA); Amr I. Abdel-Fattah, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/246,007

(22) Filed: Apr. 30, 2021

(65) Prior Publication Data
US 2022/0348816 A1 Nov. 3, 2022

(51) Int. Cl.
*E21B 43/16* (2006.01)
*C09K 8/582* (2006.01)
*C09K 8/584* (2006.01)

(52) U.S. Cl.
CPC .............. *C09K 8/582* (2013.01); *C09K 8/584* (2013.01); *E21B 43/16* (2013.01); *C09K 2208/10* (2013.01)

(58) Field of Classification Search
CPC .......... C09K 8/582; C09K 8/584; E21B 43/16
(Continued)

(56) References Cited

U.S. PATENT DOCUMENTS

| 5,049,499 A | 9/1991 | Atlas et al. |
| 6,541,240 B1 * | 4/2003 | Kilbane, II ............. C12P 17/06 |
| | | 210/600 |

(Continued)

FOREIGN PATENT DOCUMENTS

| CN | 109575895 A | 4/2019 |
| GB | 2413797 A | 11/2005 |
| KR | 20200042795 A | 4/2020 |

OTHER PUBLICATIONS

Sahebnazar, Zahra et al., "Enhancement of Pseudomonas Aeruginosa Growth and Rhamnolipid Production Using Iron-Silica Nanoparticles in Low-Cost Medium"; Journal of Nanostructures; vol. 8, Issue 1: pp. 1-10; Jan. 1, 2018 (10 pages).
(Continued)

*Primary Examiner* — William D Hutton, Jr.
*Assistant Examiner* — Ashish K Varma
(74) *Attorney, Agent, or Firm* — Osha Bergman Watanabe & Burton LLP (57) ABSTRACT

Provided is a composition that may include an aqueous phase, and extremophilic bacteria having signal transduction chemotaxis machinery and nanoemulsion oil droplets including metal-silica nanoparticles attached to a surface thereof. Further provided is a method for treating an oil reservoir, that may include introducing into the oil reservoir an extremophilic bacteria having signal transduction chemotaxis machinery and nanoemulsion oil droplets including metal-silica nanoparticles attached to a surface thereof. Further provided is method for bacteria mediated enhanced oil recovery that may include introducing extremophilic bacteria downhole to an oil reservoir. The method may further include triggering cell lysis of the extremophilic bacteria, mobilizing the oil trapped by the biosurfactants released from lysed extremophilic bacteria, and producing the oil trapped by the biosurfactants from the oil reservoir.

21 Claims, 2 Drawing Sheets

(58) Field of Classification Search
USPC .................................................. 166/305.1
See application file for complete search history.

(56) References Cited

U.S. PATENT DOCUMENTS

| | | | |
|---|---|---|---|
| 8,631,865 | B2 | 1/2014 | Olguin Lora et al. |
| 8,895,479 | B2* | 11/2014 | Roldan Carrillo ....... C12N 1/20 |
| | | | 507/201 |
| 10,378,009 | B2 | 8/2019 | Kohr |
| 10,413,966 | B2 | 9/2019 | Murugesan et al. |
| 2014/0202685 | A1 | 7/2014 | Danait et al. |
| 2014/0352945 | A1 | 12/2014 | Danait et al. |
| 2016/0222280 | A1* | 8/2016 | Kohr ........................ C12N 1/26 |
| 2018/0016883 | A1* | 1/2018 | Kjølhamar ............. C09K 8/582 |
| 2018/0125066 | A1 | 5/2018 | Bassler et al. |
| 2019/0136123 | A1* | 5/2019 | Holcomb .................. C09K 8/80 |
| 2019/0345050 | A1 | 11/2019 | Lead et al. |

OTHER PUBLICATIONS

Elakkiya, Vadivel Tamil et al., "Swift production of rhamnolipid biosurfactant, biopolymer and synthesis of biosurfactant-wrapped silver nanoparticles and its enhanced oil recovery"; Saudi Journal of Biological Sciences; pp. 1-8; Apr. 2, 2020 (8 pages).

Sahebnazar, Zahra et al., "Zero-valent iron nanoparticles assisted purification of rhamnolipid for oil recovery improvement from oily sludge"; Journal of Environmental Chemical Enginnering; vol. 6, Issue 1; pp. 917-922; Feb. 2018 (6 pages).

Singh, P. et al., "Biosurfactant production: emerging trends and promising strategies"; Journal of Applied Microbiology; vol. 126, Issue 1; pp. 2-13; Aug. 1, 2018 (12 pages).

Sun, Zhiyong et al., "Genetically Engineered Bacterial Biohybrid Microswimmers for Sensing Applications"; Sensors (Basel); vol. 20, Issue 1: 180; pp. 1-16; Jan. 2020 (16 pages).

Lanfranconi, Mariana P. et al., "A strain isolated from gas oil-contaminated soil displays chemotaxis towards gas oil and hexadecane"; Environmental Microbiology; vol. 5, Issue 10, pp. 1002-1008; Sep. 1, 2003 (7 pages).

Zhao, X. et al., "(210e) The Role of Bacterial Chemotaxis in Improving Bioremediation Efficiency"; Proceedings of the 2019 AIChE Annual Meeting, Topical Conference: Microbes at Biomedical Interfaces; pp. 1-3; Nov. 11, 2019 (3 pages).

Chandankere, Radhika et al., "An efficient biosurfactant-producing and crude-oil emulsifying bacterium *Bacillus methylotrophicus* USTBa isolated from petroleum reservoir"; Biochemical Enginnering Journal; vol. 74; pp. 46-53; May 15, 2013 (8 pages).

Barbato, Marta et al., "Cultivable hydrocarbon degrading bacteria have low phylogenetice diversity but highly versatile functional potential"; International Biodeterioration & Biodegradation; vol. 142; pp. 43-51; Aug. 2019 (9 pages).

Cai, Man et al., "*Rubrimonas shengliensis* sp. nov. and *Polymorphum gilvum* gen. nov., sp. nov., novel members of Alphaproteobacteria from crude oil contaminated saline soil"; Systematic and Applied Microbiology; vol. 34, Issue 5; pp. 321-327; Jul. 2011 (7 pages).

Olson, Mira Stone et al., "Quantification of Bacterial Chemotaxis in Porous Media Using Magnetic Resonance Imaging"; Environmental Science & Technology; vol. 38, Issue 14; pp. 3864-3870; Jul. 2004 (7 pages).

Janaki, S. et al. "A study of Hydrocarbon Degradation by Biosurfactant Producing Bacillus cereus in Oil Contaminated Soil Samples"; International Journal of Life-Sciences Scientific Research; vol. 2, Issue 4; pp. 324-332; Jul. 2016 (9 pages).

Martins, Luiz Fernando et al., "Biodegradation of Petroleum Hydrocarbons in Hypersaline Environments"; Brazilian Journal of Microbiology; vol. 43, Issue 3; pp. 865-872; Jul. 2012 (8 pages).

D'Ippólito, Sebastián et al., "Chemotactic responses to gas oil of *Halomonas* spp. strains isolated from saline environments in Argentina"; Revista Argentina de Microbiologia; vol. 43, Issue 2; pp. 107-110; Jun. 2011 (5 pages).

Halim, Amalia Yunita et al., "Microbial Enhanced Oil Recovery: An Investigation of Bacteria Ability to Live and Alter Crude Oil Physical Characteristics in High Pressure Condition"; Proceedings of the Society of Petroleum Engineers Asia Pacific Oil and Gas Conference and Exhibition; pp. 1-8; Aug. 4-6, 2009 (8 pages).

Tena-Garitaonaindia, M. et al., "Chemotaxis of halophilic bacterium *Halomonas anticariensis* FP35 towards the environmental pollutants phenol and naphthalene"; Science of the Total Environment; vol. 669; pp. 631-636; Jun. 15, 2019 (6 pages).

Omajali, Jacob B. et al., "In-situ catalytic upgrading of heavy oil using dispersed bionanoparticles supported on gram-positive and gram-negative bacteria"; Applied Catalysis B: Environmental; vol. 203; pp. 807-819; Apr. 2017 (13 pages).

Berdugo-Clavijo, Carolina et al., "Conversion of crude oil to methane by a microbial consortium enriched from oil reservoir production waters"; Frontiers in Microbiology; vol. 5, Article 197; pp. 1-10; May 5, 2014 (10 pages).

Gieg, Lisa M. et al., "Bioenergy Production via Microbial Conversion of Residual Oil to Natural Gas"; Applied and Environmental Microbiology; vol. 74, Issue 10; pp. 3022-3029; May 2008 (8 pages).

Jones, D. M. et al., "Crude-oil biodegradation via methanogenesis in subsurface petroleum reservoirs"; Nature; vol. 451; pp. 176-180; Jan. 10, 2008 (6 pages).

\* cited by examiner

AUTONOMOUS EXTREMOPHILES FOR DOWNHOLE OIL AND GAS APPLICATIONS CONTROLLED BY METAL SILICA NANOPARTICLES

BACKGROUND

A petroleum reservoir is an underground pool of hydrocarbon compounds contained in porous or fractured rock formations. The petroleum in the reservoir is accessed through one or more borings in the earth that penetrate the material above the reservoir and enable transport of the petroleum to the surface. Enhanced oil recovery (EOR) processes increase oil production rates of problematic and underperforming hydrocarbon bearing wells and fields. The EOR processes used in modern oil and gas operations may include, for example, chemical, hydro chemical, thermal, fluid/superfluid and microbial-based processes. Many of these EOR processes use water flooding, for example, to increase the pressure within the reservoir, thereby increasing oil production rates; and to displace hydrocarbons within the reservoir. Microbial enhanced oil recovery (microbial EOR) allows for oil entrapped in the reservoir matrix to be targeted by using microbes.

SUMMARY

This summary introduces a selection of concepts that are further described in the detailed description. This summary is not intended to identify key or essential features of the claimed subject matter, nor is it intended to be used as an aid in limiting the scope of the claimed subject matter.

In one aspect, a composition may be provided that includes an aqueous phase, and extremophilic bacteria having signal transduction chemotaxis machinery and nanoemulsion oil droplets including metal-silica nanoparticles attached to a surface thereof. The extremophilic bacteria may produce biosurfactants, and the signal transduction chemotaxis machinery may respond to a hydrocarbon food source.

In another aspect, a method for treating an oil reservoir may be provided that includes introducing into the oil reservoir an extremophilic bacteria having signal transduction chemotaxis machinery and nanoemulsion oil droplets including metal-silica nanoparticles attached to a surface thereof.

In a further aspect, a method for bacteria mediated enhanced oil recovery may be provided that includes introducing extremophilic bacteria downhole to an oil reservoir. The method may further include allowing the extremophilic bacteria to be delivered to a hydrocarbon food source in the oil reservoir via a chemotaxis mechanism of mobility, wherein bacterial growth occurs upon reaching the hydrocarbon food source. The method may further include triggering cell lysis of the extremophilic bacteria to occur, whereupon biosurfactants are released from lysed extremophilic bacteria, thereby trapping oil from the oil reservoir with the biosurfactants. The method may further include mobilizing the oil trapped by the biosurfactants away from porous rock; and producing the oil trapped by the biosurfactants from the oil reservoir.

Other aspects and advantages of the invention will be apparent from the following description and the appended claims.

DETAILED DESCRIPTION

Embodiments of the present disclosure relate to bioengineered extremophilic bacteria for use in microbial EOR. Unlike other forms of EOR, microbial EOR allows for increased activity over time due to microbial growth. Increased microbial EOR from growth activity can be present at distances farther from the point of injection compared to, for example, chemical EOR, in which chemicals may be diluted farther from an injection site. Thus, microbial EOR can increase the process efficiency over time and distance relative to other forms of EOR.

An extremophilic bacteria is a bacteria that has traits of an extremophile (a microorganism that lives in extreme environments, for example, deserts, thermal springs, and saltpans). These extremophilic bacteria have traits that allow them to thrive, for example, in harsh conditions including high salinity, temperatures and pressure. In particular, such bacteria may produce biosurfactants, and thus the bacteria's use downhole may allow for the in-situ production of biosurfactants within the reservoir. Such biosurfactants may trap and mobilize oil within the reservoir, thereby resulting in an enhanced oil recovery. The high temperatures and salinity of a well bore or reservoir may include ideal conditions for extremophilic bacteria growth. The bioengineered extremophilic bacteria may be modified either at their surface or both at their surface and at a genetic level. When modified at the genetic level, the bioengineered extremophilic bacteria may include traits of multiple native extremophilic bacteria (and other forms of bacteria) simultaneously.

Figure 1:
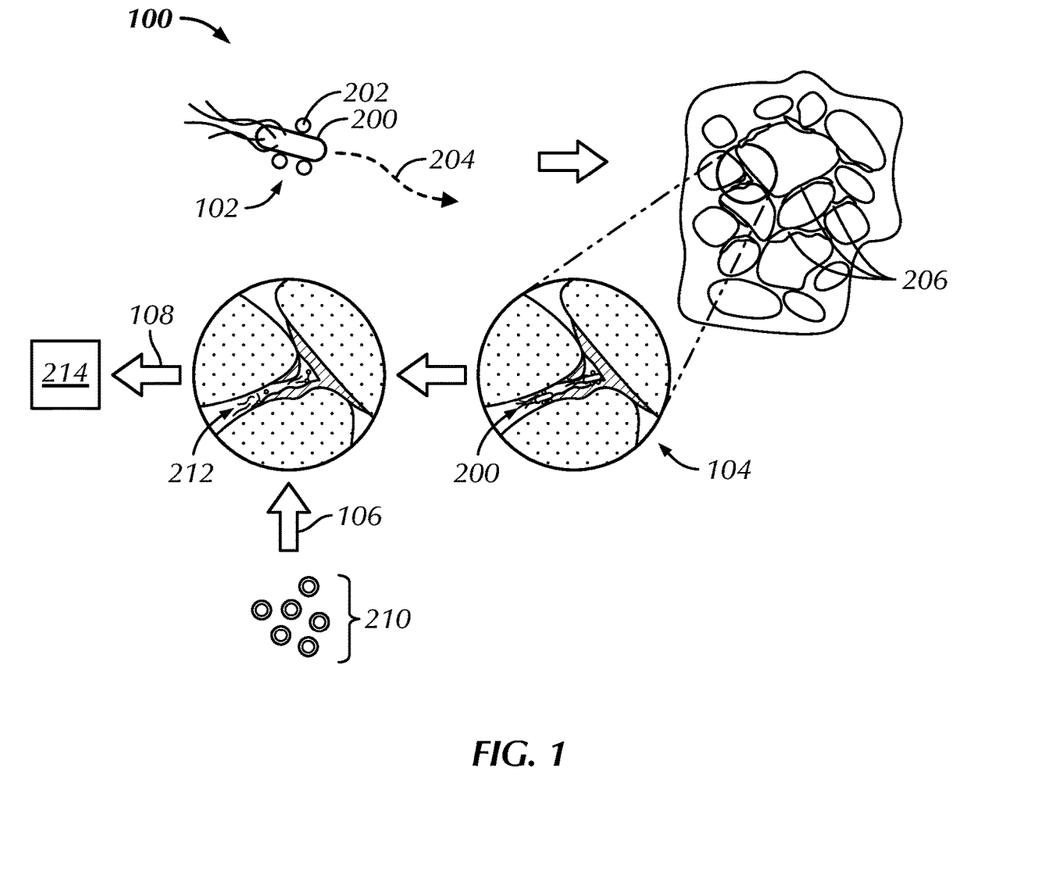
FIG. 1 illustrates a method for microbial EOR using the extremophilic bacteria according to one or more embodiments herein.

FIG. 1 illustrates a schematic of stages of microbial EOR 100 in a reservoir. At a first stage 102, extremophilic bacteria 200 with metal-silica nanoparticles 202 attached to a surface thereof are delivered to a reservoir (not shown). Upon delivery into a reservoir, at a second stage 104, extremophilic bacteria 200 are transported to a hydrocarbon food source 206 via a chemotaxis mechanism of mobility 204. Once arriving at the hydrocarbon food source 206 (which is trapped oil), the extremophilic bacteria 200 attach to the hydrocarbon food source 206 (trapped oil), and begin to grow. The metal-silica nanoparticles 202 aid the growth of the extremophilic bacteria 200, which produce biosurfactants. At a subsequent stage 106, a metal-silica nanoparticle solution 210 is introduced into the reservoir to initiate cell lysis. The lysed extremophilic bacteria 212 further release biosurfactants at a final stage 108. Biosurfactants released by the lysed extremophilic bacteria 212 may alter the wettability of the reservoir rock, thereby releasing the oil from the rock. Oil is mobilized away from porous rock, and may be brought to the surface as produced oil 214.

Figure 2:
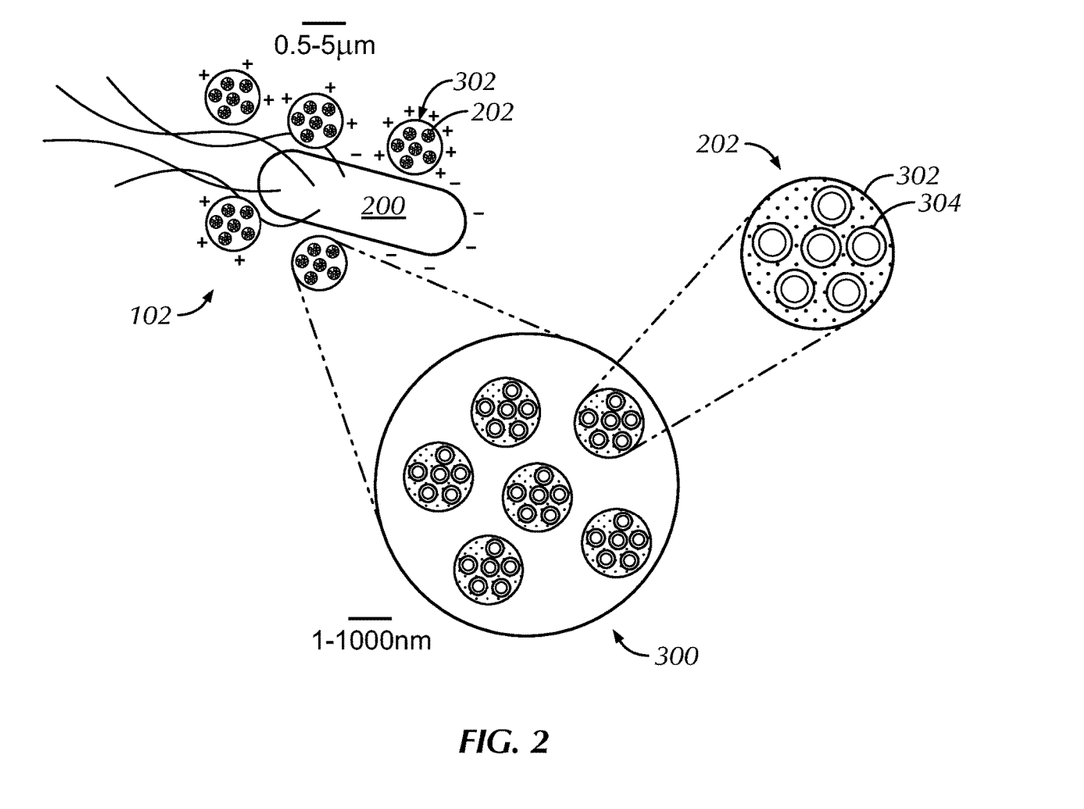
FIG. 2 shows a bacterial composition including the extremophilic bacteria and metal-silica nanoparticles according to one or more embodiments herein.

FIG. 2 illustrates a schematic of the extremophilic bacteria 200 shown in FIG. 1. As shown in FIG. 2, extremophilic bacteria 200 include metal-silica nanoparticles 202 attached to a surface of the extremophilic bacteria. Metal-silica nanoparticles 202 are encapsulated within nanoemulsion oil droplets 300. An expanded view of a nanoemulsion oil droplet 300 illustrates metal-silica nanoparticles 202 that are formed from silica-based mesoporous nanoparticles 302 that include metal nanoparticles 304 therein.

Composition

In one or more embodiments, a composition for microbial EOR includes an aqueous phase and extremophilic bacteria.

The extremophilic bacteria have nanoemulsion oil droplets that encapsulate metal-silica nanoparticles attached to their surface and have either native or engineered signal transduction chemotaxis machinery.

Extremophilic Bacteria

Extremophilic bacteria are a component of the composition and have versatile metabolic capabilities of producing vigorous enzymes called "extremozymes" and other biological products that resist degradation under extreme conditions. Extremophilic bacteria, their extremozymes and biological products are suitable for the extreme conditions found in oil and gas applications. The biomolecules produced by growing extremophilic bacteria include biosurfactants.

One or more embodiments of the disclosure use bioengineered extremophilic bacteria that withstand extreme conditions of the reservoir and selectively move towards trapped oil zones downhole. Extremophilic bacteria can survive and function efficiently under harsh reservoir conditions to produce biosurfactants suitable for enhanced oil recovery. Harsh reservoir conditions may include high salinity, in some instances exceeding 500,000 ppm TDS; high temperatures, from 50° C. to 120° C. in some instances; and high pressures. The extremophilic bacteria produce biosurfactants that will mobilize the oil trapped in the reservoir, thereby enhancing or improving oil recovery from a reservoir.

Extremophilic bacteria may be halophiles or may include halophilic properties. Halophilic properties may include an ability of bacteria to withstand a range of salt concentration from about 0.3 molar (M) to about 5 M. In one or more embodiments, the extremophilic bacteria may include halophiles classified as slight halophiles, moderate halophiles, and extreme halophiles. Slight halophiles may grow in salt concentrations ranging from 0.3 M to 0.8 M (salinity or salt concentration of total solution). Moderate halophiles may grow in salt concentrations ranging from about 0.8 M to 3.4 M. Extreme halophiles may grow in salt concentrations up to 5 M.

Extremophilic bacteria may be thermophiles or may include thermophilic properties. Thermophilic properties may include an ability to withstand a temperature range from about 50° C. to about 95° C. In one or more embodiments, the extremophilic bacteria may include thermophiles classified as simple thermophiles, extreme thermophiles, and hyper thermophiles. Simple thermophiles may grow in temperatures from 50° C. to 64° C. Extreme thermophiles may grow in temperatures from 65° C. to 70° C. Hyper thermophiles may grow in temperatures from 50° C. to 95° C.

Thermophiles that grow in a higher temperature, for example extreme and hyper thermophiles, may have a reduced ability to grow below 50° C. as compared to bacteria that grow at lower temperature. An example of a thermophile includes, but is not limited to, *Aquifex pyrophilus*, which may grow in temperatures up to 95° C.

Extremophilic bacteria may be piezophiles or may include piezophilic properties. Piezophilic properties may include an ability to withstand a pressure range from about 100 megapascal (MPa) to about 340 MPa.

Various locations promote growth of extremophilic bacteria species. These species can be targeted and obtained from locations including oil reservoirs, oil fields, oil samples, reservoir fluid samples, formation water from oil and gas fields, oil-contaminated soil, oil-contaminated wastewater, desert plants, drilling mud, seawater and sediments, hot springs, salt pans, mangroves, and other extreme environments that allow extremophilic bacteria to thrive.

Extremophilic bacteria can be classified as Gram-positive, Gram-negative, Gram-variable, or acid-fast. Gram-variable organisms are those that cannot be classified by Gram stain; they may have characteristics of one or both Gram-positive and Gram-negative bacteria. Acid-fast bacteria may include acids such as mycolic and fatty acids, waxes, and other lipids in their cell walls and are not permeable to Gram stain dyes or procedures.

Although the targeted extremophilic bacterial group are extremophiles, any of the following species may be included in one or more embodiments, so long as a strain of the species possess or is engineered to express several extremophilic traits.

The bioengineered extremophilic bacteria may include one or more of the following Gram-positive bacteria: *Arthrobacter calcoacetiens, Bacillus subtilis, Bacillus licheniformis, Bacillus mojavensis, Bacillus firmus, Bacillus halodurans, Bacillus mycoides, Bacillus stearothermophilus, Brevibacterium brevis, Corynebacterium insidibasseosum, Rhodococcus erythropolis, Thermoanaerobacter pseudethanolicus, Thermoanaerobacter ethanolicus*, and *Virgibacillus salaries.*

The bioengineered extremophilic bacteria may include one or more of the following Gram-variable bacteria with Gram-positive characteristics: *Methanobacterium, Paenibacillus alvei*, and *Paenibacillus ehimensis.*

The bioengineered extremophilic bacteria may include one or more of the following Gram-negative bacteria: *Acinetobacter calcoaceticus, Acinetobacter radioresistens, Alcanivorax borkumensis, Enterobacter aerogens, Enterobacter cloacae, Methylococcus capsulatus, Pseudomonas aeruginosa, Pseudomonas putida, Pseudomonas stutzeri, Pyrobaculum aerophilum, Rhizobium radiobacter, Thalassolituus oleivorans*, and *Xanthomonas campestris.*

The bioengineered extremophilic bacteria may include acid-fast bacteria from a genus *Mycobacterium.*

The bioengineered extremophilic bacteria may include one or more of the following: sulfate-reducers, nitrate-reducers, iron-reducers, fermenters, and acetogens. The bioengineered extremophilic bacteria may include genes or functions related to the Examples of sulfate-reducers may include sulfate-reducing bacteria such as one or more from the genus *Desulfovibrio, Desulfotignum, Desulfomicrobium, Desulfobulbus, Desulfotomaculum, Desulfomicrobium, Desulfocapsa*, and *Desulfococcus*. Examples of nitrate-reducers may include nitrate-reducing bacteria such as one or more from the genus *Chromohalobacter, Halomonas, Bacillus, Nocardia, Gordonia, Ensifer*, and *Pseudomonas*. Examples of iron-reducers may include iron-reducing bacteria such as one or more from the genus *Stenotrophomonas, Brachymonas, Paracolobacterum, Serratia, Aerobacter, Citrobacter, Bacillus*, and *Pseudomonas*. Examples of fermenters may include fermenting bacteria such as one or more from the genus *Soehngenia, Desulfovibrio, Desulfotomaculum* and *Archaeoglobus*. Examples of acetogens may include acetogenic bacteria such as one or more from *Desulfomicrobium Hypogeium* sp. nov. and *Acetobacterium psammolithicum* sp. nov.

The bioengineered extremophilic bacteria may be found in a reservoir or may be sourced from a different location than the reservoir. When sourced from a reservoir, bacteria existing in the reservoir may be removed from said reservoir for bioengineering to create the bioengineered extremophilic bacteria before returning to the reservoir.

In one or more embodiments, the bioengineered extremophilic bacteria that may be used in one or more embodiments of the present disclosure, may include one or more of the following order/genus: Alteromonadales/*Marinobacter*, Syntrophobacterales/*Smithella*, Syntrophobacterales/*Syntrophus,* Desulfovibrionales/*Desulfovibrio*, Clostridiales/*Desulfotomaculum*, Clostridiales/*Clostridium*, Campylobacterales/*Arcobacter,* Campylobacterales/*Sulfurospirillum*, Pseudomonadales/*Pseudomonas*, Rhizobiales/*Rhizobium*, Sphingomonadales/*Sphingomonas*, Syntrophobacterales/*Thermosulforhabdus*, Bacillales/*Anaerobacillus*, Bacillales/*Bacillus*, Clostridiales/*Thermosyntropha*, Hydrogenophilales/*Tepidiphilus*, Rhodospirillales/*Tistrella*, Thermales/*Thermus*, Thermoanaerobacterales/*Thermoanaerobacter*, Actinobacteria/*Thermoleophilia*, Actinomycetales/*Dietzia*, Actinomycetales/*Rhodococcus*, Alteromonadales/*Marinobacterium*, Rhodobacterales/*Donghicola*, Rhodobacterales/*Hyphomonas*, Rhodobacterales/*Paracoccus*.

A bacterial species has a growth rate that is based on variables including but not limited to time, nutrients, and food source availability. In general, a bacterial growth curve consists of four main phases: a lag phase, a log or exponential phase, a stationary phase, and a death phase. Bacterial density in a reservoir may reach a peak during the log phase, when nutrients are depleted at a faster rate than an accumulation of waste products, and when cell multiplication (for example, a cell doubling rate) continues at a constant rate. Cell doubling during the log phase means that both the number of cells and the rate of population increase at least doubles with each consecutive (similar) time period. After the log phase, bacterial growth plateaus and enters the stationary phase, where the number of dividing cells equal the number of dying cells. Thus, where bacterial growth (and biosurfactant production) is at the highest level is in the log phase or exponential phase, compared to biosurfactant production in other phases. One or more embodiments may thus provide for allowing bacterial growth to reach this log phase, maximizing biosurfactant production compared to other growth phases, and targeting cell lysis during the transition from the log phase to the stationary phase.

Metal-Silica Nanoparticles

As mentioned, the extremophilic bacteria of the present disclosure may include metal-silica nanoparticles attached the surface of the bacteria, such as through a nanoemulsion oil droplet. Metal-silica nanoparticles that are attached to the cell surface via nanoemulsion oil droplets control an enhanced growth cycle. The enhanced growth cycle is the targeted log phase of extremophilic bacteria growth. When the extremophilic bacteria experience an enhanced growth cycle, they are able to produce a higher concentration of biosurfactants compared to without surface-attached metal silica nanoparticles.

In one or more embodiments, the size of the metal-silica nanoparticles range from about 10 nanometers (nm) to 1000 nm, such as ranging from a lower limit of any of 10, 20, 50, 100, or 250 nm, to an upper limit of any of 250, 500, 750, or 1000 nm, where any lower limit can be used in combination with any upper limit.

As mentioned above, the silica may form a mesoporous silica structure in which metal nanoparticles may be included. In one or more embodiments, a source of silica to form the mesoporous silica structure of the metal-silica nanoparticles may include, but is not limited to, tetraethyl orthosilicate (TEOS), sodium silicate, and 3-aminopropyl triethoxysilane.

Silica nanoparticles are generally known for stability under extreme conditions, for example, at high temperatures up to 90° C. and salinity up to 100 g/L. Stability related to silica nanoparticles refers to resistance to degradation without affecting the function of a silica nanoparticle. Additionally, nanoemulsions are generally known to be stable under similar extreme conditions. Stability related to nanoemulsions refers to colloidal or suspension stability.

In one or more embodiments, metal ions in the metal-silica nanoparticles may include, but are not limited to, ions of iron, copper, manganese, and magnesium. Metal ions may be molecular iron (multiple iron atoms together) such as ferrous ($Fe^{2+}$) and ferric ($Fe^{3+}$) iron, or the iron may be atomic iron (single iron atom or cluster that is separated, for example, and bound to a particle) such as $Fe(OH)_3$ polymer. Where molecular iron is included, the molecular iron may be sub-micrometer iron particles or nanoscale iron particles. Metal ions may be metal salts including, but not limited to, salts of iron, copper, manganese, and magnesium. Examples of metal salts include, but are not limited to, $FeCl_3$, iron (II) citrate, $CuSO_4$, $MnCl_2$, and $MgSO_4$. Iron chloride (and other iron salts) may be used to solubilize iron and make it available to bacterial uptake. The type of metal nanoparticle selected may depend on the bacterial species (to enhance biosurfactant production) that is being used in one or more embodiments; however, iron is generally known to be an essential metal for growth and biosurfactant production in a wide range of bacterial species.

In one or more embodiments, the particular metal-silica nanoparticles that are attached to the surface of the extremophilic bacteria via nanoemulsion oil droplets are iron-silica nanoparticles, which may also be referred to as Fe—Si-NPs.

Fe—Si-NPs may be synthesized similarly through a classical sol-gel reaction to known $Fe_3O_4$@silica composites, which are surface-charged magnetic nanoparticles with a thin layer of $SiO_2$ shell. An example synthesis of a classical sol-gel reaction is described in "Bacterial at Ultralow Concentration," *Nanoscale Res. Lett.* 14, 195, 2019, in which magnetic composite nanoparticles had a diameter of 450 nm and were composed of uniformed $SiO_2$ coating (60 nm in size). In the present case, $FeCl_3$, iron (II) citrate, or other iron salts compatible with bioengineered extremophilic bacteria are utilized in the synthesis of Fe—Si-NPs. Another method for general iron nanoparticle synthesis is described in Kiran, et al., BMC Biotechnology, 14:48, 2014, which also describes specific Fe—Si-NPs, along with Liu, et al., 2013. General synthesis of mesoporous silica nanoparticles is further described in Alsmaeil, et al., 2020.

The effects of metal-silica nanoparticles on the extremophilic bacteria are dependent on concentration of the particles both on the cell surfaces and in the solution. At low concentrations, metal-silica nanoparticles enhance the production of biosurfactants and allow cell growth. At high concentrations, metal-silica nanoparticles lead to cell lysis due to aggregation of the metal-silica nanoparticles that cause toxic effects on the cells.

Generally, the metal-silica nanoparticles are inside oil nanodroplets when they are attached to the bacteria surface. As the bacteria contacts trapped oil hydrocarbons, the metal-silica nanoparticles may be released from the nanoemulsion oil droplets. The metal-silica nanoparticles may be mesoporous and include nutrients for bacterial growth and surfactant production in its pores. After they are released from the nanoemulsion, metal-silica nanoparticles may release nutrients that enhance bacterial growth and biosurfactant production over time. The nutrients are released gradually over time from the pores of the metal-silica nanoparticle. The time-release nutrients can be released in up to a few hours to up to a few days.

Without wanting to be bound by theory, it is believed that when iron is included in the metal-silica nanoparticles, iron breaks apart to release from the Fe—Si-NPs, and the iron is absorbed through known cellular pathways in the extremophilic bacteria.

As the metal-silica nanoparticles release iron, the iron is released at a rate that depends on an increase of metal-silica nanoparticle concentration over time. Initially, a low concentration of iron that is released from the metal-silica nanoparticles allows for bacterial growth and a wide variety of important metabolic processes. An increased concentration of iron that is released from the metal-silica nanoparticles allows an initiation of cell death by known biochemical mechanisms involving iron. As the bacteria cells lyse, they release intracellular (and intercellular) biosurfactants that will mobilize trapped oil (and facilitate enhanced oil recovery).

Low concentrations of metal-silica nanoparticles, i.e., attached to the surface of the bacteria, may be in a range of from 0.01 milligrams per liter (mg/L) to 1000 mg/L. Selection of a particular concentration may depend, for example, on the desired amount of biosurfactant production, and the species of bacteria. Low concentrations of metal-silica nanoparticle, such as a range of 0.5 to 20 mg/L of metal-silica nanoparticles attached to the surface of the bacteria (and/or released into the extracellular environment just around the surface of the bacteria), may produce a log-phase effect compared to very low concentrations or high concentrations of metal-silica nanoparticle. Very low concentration of metal-silica nanoparticle may include concentrations that do not produce a log-phase effect, including but not limited to 0 mg/L up to 0.5 mg/L (which may vary depending on bacteria species). For example, Kiran, et al., 2014 describes that 10 mg/L of iron nanoparticles are known to enhance the growth of *Nocardiopsis* MSA13A, thereby increasing the production of biosurfactants (by up to 80%). Meanwhile, 1 mg/L of iron nanoparticles enhanced the growth and biosurfactant production by 63% in *Serratia* species and by 57% in *Pseudomonas aeruginosa*, in each respective species.

High concentrations of metal-silica nanoparticles, i.e., subsequently added to the reservoir to initiate cell lysis, may be in a range of greater than or equal to 1000 mg/L, such as greater than 1000 mg/L. Selection of a particular concentration may depend, for example, on the species of bacteria. In one example, Kim, et al., 2009 found 400 μM of $Fe^{3+}$ to be toxic to *Pseudomonas syringae*. In another example, Kalantari, 2008 found that the growth of gram negative bacteria was completely inhibited at $Fe^{2+}$ concentrations of 1 mM/L. In a further example, Sorokina, et al., 2013, found that an estimated concentration of iron in the range of 100 μM to 5 mM, and 0.5 mg/L to 20 mg/L inhibited the growth of bacteria or allowed toxicity to affect bacteria growth.

Low concentrations of metal-silica nanoparticles, for example, iron-silica nanoparticles at around 1 milligram per liter (mg/L) of bacteria culture may increase the production of biosurfactants including rhamnolipid by over 50% upon cell lysis, specifically 57%, compared to a control medium that is free of iron-silica nanoparticles. Generally, the surface-attachment of nanoparticles to the bioengineered extremophilic bacteria may occur in a broad Fe—Si—NP concentration range of from 0.01 mg/L to 1000 mg/L. For example, Kiran, et al., 2014, describes iron nanoparticle preparation in such broad concentration range.

Non-limiting examples of optimal Fe—Si—NP concentrations utilized for different bacterial species include *Nocardiopsis* MSA13A, with a concentration of 10 mg/L Fe—Si-NPs, which may increase biosurfactant production up to 80%, as described in Yang, et al., ACS Omega, 6321-6329, 2020, which is herein incorporated by reference in its entirety. In *Serratia* species, 1 mg/L of Fe—Si-NPs may increase biosurfactant production up to 63%. In *Pseudomonas aeruginosa*, 1 mg/L of Fe—Si-NPs may increase the biosurfactant production by 57%, as described in Sahebnazar, et al., J. Nanostruct. 8(1), 1-10, Winter 2018, which is herein incorporated by reference in its entirety.

Metal-silica nanoparticles are attached or bound to the cell surface using various binding mechanisms, depending on the bacterial species used. These mechanisms are not limited to one or more of hydrophobicity binding, chemical binding, slime adhesion, electrostatic binding, and genetic engineered biochemical binding, as described, for example, in Park et al., ACS Nano. 11, 8910-8923, 2017, which is incorporated by reference in its entirety. Further mechanisms directed to cell surface attachment are described in, for example, Julio, et al., 2018.

In one or more embodiments, electrostatic attachment of positively charged nanoparticle surfaces occurs with negatively charged bacterial surfaces. The cell surfaces of these extremophilic bacteria generally carry an overall negative surface charge. Specifically, Gram-positive, Gram-negative, and acid-fast bacteria may have overall negative surface charge.

In one or more embodiments, the metal-silica nanoparticles are encapsulated in nanoemulsions. The nanoemulsions bind with affinity to the charged bacteria cell surface in an amount that releases iron to produce an effect of one or more embodiments. Such an effect relates to producing a log-phase effect or a lysis effect. It is believed that a strength of the electrostatic interaction between the nanoemulsion oil particle and the cell surface may survive under harsh and changing reservoir conditions. Binding between nanoemulsions and bacteria cell surfaces are known in the art.

Depending on bacterial species, other binding or surface attachment methods to nanoemulsions or nanoparticles may be included, for example, chemical bonding such as covalent bonding, specific chemical attachment, and hydrophobicity interactions.

Metal-silica nanoparticles, for example, Fe—Si—NPs, both enhance the production of biosurfactants when attached to the cell surface via nanoemulsion oil droplets, and allow control over bacterial growth to prevent clogging of the reservoir, when at high concentrations. Specifically, when a solution of metal-silica nanoparticles is injected into the reservoir where the surface-modified biosurfactants are already present, this subsequent introduction of nanoparticles can initiate cell death.

Generally, the bioengineered extremophilic bacteria may be made by first modifying the genetic and/or enzymatic material in the bacteria, second, creating the nanoemulsion having metal-silica nanoparticles such as Fe—Si-NPs, and third, connecting the nanoemulsion oil droplets to the bacteria surface.

The step of modifying the genetic and/or enzymatic material in the starting bacteria includes identifying a separate target bacteria that has the desired genes for the targeted enzymatic material. Once the starting and target bacteria are identified, the genome sequencing of both bacteria are collected to provide a reference genetic map. The identity of the gene(s) of interest in the target bacteria is performed by known sequencing, such as in sequence databases or by performing transcriptome and metabolome studies which highlight the key genes involved in the targeted metabolic pathways for the targeted enzyme production. The gene(s) of interest is then multiplied by Polymerase Chain Reaction (PCR) or by a similar technique known in the art to generate the construct or plasmid within the targeted bacteria. The plasmid is a portion of bacterial DNA that functions as a vector carrying the gene(s) of interest. The gene(s) of interest will be inserted into the starting bacteria (the extremophilic bacteria that is a recipient of the plasmid, or the recipient extremophilic bacteria). The plasmid is used as a production vector which enables the gene(s) to be replicated many times within the starting bacteria (the recipient extremophilic bacteria). The recipient extremophilic bacteria cells that successfully take up plasmids are called bioengineered extremophilic bacteria cells, which are transformed or transgenic bacteria cells or genetically modified strains of the extremophilic bacteria cells. These bioengineered extremophilic bacteria cells are considered the host cells for the plasmids. The bioengineered extremophilic bacteria are and/or grow from the host cells, while reproducing the gene(s) of the plasmid as well as the starting bacteria.

The nanoemulsion having metal-silica nanoparticles such as Fe—Si-NPs is created from methods known in the art. Such methods for a nanoemulsion having metal-silica nanoparticles is described in the following references. Synthesis of iron-containing MCM-41 porous silica is described in Bourlinos, et al., J. Phys. Chem. B, 104, 4375-4380, 2000. Other Fe—NP synthesis procedures are described in Kiran, et al., 2014; Bourgeat-Lami, et al., Langmuir, 28, 14, 6021-6031, 2012; and Mirmohseni, et al., Polymer, 98, 182-189, 2016.

Different mechanisms may be used to connect the nanoemulsion oil droplets to the bacteria surface. Such mechanisms include binding the nanoemulsion to the bioengineered extremophilic bacteria using chemical, physical, or electrostatic interaction. Factors that may determine the nature of the binding mechanism may also effect electrostatic and intermolecular forces. Such factors may include, but are not limited to bacterial motility that may enhance adhesion to oil droplets and bacterial hydrophobicity that may enhance the stability of binding with the oil droplets. Electrostatic and intermolecular forces may control the thermodynamics of the adhesion properties (not limited to van der Waals forces and hydrogen bonding). These and other known mechanisms in the art may be applied depending on the bacterial species and reservoir conditions.

Chemotaxis Mechanism

The extremophilic bacteria are also equipped with a chemotaxis mechanism of mobility, which allows the bacteria to locate hydrocarbons that leach into the aqueous phase in which the bacteria are suspended. When the sole carbon source for survival and growth is hydrocarbon based oil, the extremophilic bacteria (with the chemotaxis mechanism of mobility) will autonomously migrate toward the oil, which is the hydrocarbon food source. However, in one or more embodiments the extremophilic bacteria are genetically engineered to prevent them from ingesting the oil. In this instance, the metal-silica nanoparticles will be equipped with a separate food source, such as a hydrocarbon food source, than oil to support extremophilic bacteria functions. Such a separate food source may include but is not limited to a hydrocarbon food source in the metal-silica nanoparticles. Chemotaxis relies on concentration gradients; generally, if two or more sources of hydrocarbons leach from different source locations, the extremophilic bacteria will migrate toward the location with higher concentration of hydrocarbons. When that location is depleted of its hydrocarbon source, they may autonomously migrate toward the region leaching a next location of concentrated hydrocarbons in their vicinity.

In one or more embodiments, nutrients that are released from the metal-silica nanoparticles are the sole carbon-based food source for the extremophilic bacteria. Nutrients may be released from the metal-silica nanoparticles that are carried in nanoemulsion oil droplets on the bacteria surface. These nutrients that may be released may include a carbon food source, not limited to sugar and vegetable oil. Sugar may include, but is not limited to, glucose, maltose, sucrose, and molasses. Vegetable oil may include, but is not limited to, palm oil and olive oil. Nutrients that may be released may include a nitrogen source, iron salts, trace essential metals, and salts. The nitrogen source may include, but is not limited to, yeast extract, urea peptone, ammonium sulphate, ammonium nitrate, sodium nitrate, meat extract, and malt extracts. Iron salts and trace essential metals and salts may include, but are not limited to, $Mn^{2+}$, $CaCl_2$), $ZnSO_4$, $MnSO_4$, nitrate salt, magnesium salt, $NaNO_3$, $MgSO_4$ (and others as previously described).

In one or more embodiments, hydrocarbons present in the reservoir are the sole carbon-based food source for the extremophilic bacteria. Using chemotaxis, they are driven directly towards trapped oil zones in the reservoir. The chemotaxis mechanism of mobility is dependent on bacterial species and the physico-chemical properties of hydrocarbon substrates and its bioavailability.

The chemotaxis mechanism of mobility within the bacteria is a type of signal transduction machinery. In one or more embodiments, this signal transduction chemotaxis machinery is found naturally in the extremophilic bacteria. In other embodiments, the signal transduction chemotaxis machinery may be bioengineered, such as through genetic modification. When the chemotaxis machinery is bioengineered into the extremophilic bacteria, the bacteria have non-naturally occurring signal transduction chemotaxis machinery. Signal transduction is a molecular process that occurs in various types of living cells in response to an external or internal stimuli, which can be a stimuli that is a physical or a chemical stimuli and in this instance, hydrocarbons are an example of an external stimulus. The stimuli is received through receptor(s) on the cellular membrane, which begins a cascade of biochemical signaling events ("signaling cascade") within the cell. In cooperation with a receptor, the signaling cascade transforms the stimuli that has been introduced into biochemical signals via pathways that may be activated by biochemical reactions such as phosphorylation. This signaling cascade ends up in expression or reduction of targeted genes (or biochemical processes) involved in the particular stimuli, in one or more embodiments resulting in movement or motility toward the hydrocarbon stimuli.

The receptor on the cellular membrane involved in receiving stimuli may be a chemoreceptor. Chemoreceptors are a group of cellular receptors involved in chemotaxis and are configured to receive a particular chemical or multiple chemicals. A wide variety of chemoreceptors are included among different bacterial species. One example is a range of aromatic compounds that are degraded by *Pseudomonas* employing 14 different peripheral pathways to a few common intermediates, which are funneled to the tricarboxylic acid (TCA) cycle. Another example of a chemoreceptor is MCP2901 of *C. testosteroni* CNB-1 binds to 9 aromatic compounds to initiate downstream signaling processes and cause chemotaxis motility, as described in Huang, et al., 2016. The MCP2901 chemoreceptor allows for metabolismdependent and metabolism-independent chemotaxis toward the direction of aromatic compounds. Some bacterial species may have up to 60 chemoreceptors. Bacteria with chemosensory signaling capability may include, on average, up to 14 chemoreceptor genes (genes directly relating to the biosynthesis of a chemoreceptor). It is envisioned that an example of a chemoreceptor in one or more embodiments of the present disclosure is a histidine kinase (HK) receptor.

A two-component regulatory system is a basic stimulus-response signaling mechanism, described above, that is commonly found in bacteria and less commonly found in archaea and eukaryotes. It is a type of signal transduction machinery generally including: signaling components, for example, histidine kinase (HK); a membrane receptor that senses an external stimulus, coupled with a response regulator (RR); and a receiver domain that mediates the cellular response, together initiating a signal transduction through a phosphorylation cascade. When a target external stimulus is present, HK transfers a phosphoryl group via auto-phosphorylation to a histidine residue in a cascade reaction. RR then catalyzes this transfer to an aspartate residue on the RR receiver domain, which consequently triggers a conformational change in the RR that regulates the expression of the targeted genes for that particular stimulus.

Signal transduction chemotaxis machinery, particularly a two-component system, is found naturally in bacterial species, especially those living in rapidly or continually changing environments, or in an environment that contains highly competitive microbial species. Bacteria have a two-component system that allows signaling including cell-cell communication, adaptation to environmental, and pathogenesis. In one or more embodiments, the chemotaxis mechanism of mobility is a two-component system with "active-selective movement". The bacteria movement is "active" (or mobile) and simultaneously "selective" (or discriminatory) toward an input signal (hydrocarbon) in the two-component system. The number of two-component systems in bacterial species may vary depending on the nature of the environment. In one or more embodiments, the two-component signaling machinery that senses hydrocarbons in the surrounding environment are either native within the extremophilic bacteria or are transferred from a different bacteria either through horizontal gene transfer, bacteriophages, or via genetic engineering.

Generally, extremophilic bacteria having chemotaxis traits toward hydrocarbons may include thermophiles, hyperthermophiles, alkaniphiles, piezophiles, xerophiles, and halophiles. Additionally, hydrocarbon degrading bacteria having chemotaxis traits toward hydrocarbon may be used (either as the bacterial cells or their genes related to motility toward oil) including, but not limited to, *Achromobacter, Acinetobacter, Alkanindiges, Alteromonas, Arthrobacter, Burkholderia, Dietzia, Enterobacter, Kocuria, Marinobacter, Mycobacterium, Pandoraea, Pseudomonas, Staphylococcus, Streptobacillus, Streptococcus*, and *Rhodococcus*.

In one or more embodiments, the bioengineered extremophilic bacteria incorporate the genes or enzymes involved in detection of hydrocarbon (oil) and motility (chemotaxis) movement of the bacteria toward the oil. The genes or enzymes involved in the oil hydrocarbon detection and motility (chemotaxis) may include, but are not limited to, alkane 1-monooxygenase, alcohol dehydrogenase, cyclohexanol-dehydrogenase, methane monooxygenase and cyclohexanone 1,2 monooxygenase, which are involved in degradation of alkanes. Other examples of genes or enzymes include, but not limited to, naphthalene 1,2-dioxygenase ferredoxin reductase component, cis-2,3-dihydrobiphenyl-2, 3-diol dehydrogenase and salicylaldehyde dehydrogenase, which are associated with naphthalene degradation. Further examples of genes or enzymes include, but are not limited to, benzene dioxygenase, toluene dioxygenase, and ethylbenzene dioxygenase, which are associated with petroleum hydrocarbons (besides alkanes and naphthalene).

A hydrocarbon concentration gradient may be formed when hydrocarbons from an oil phase leach into the aqueous phase. Advantageously, chemotaxis may stimulate bacterial motility in response to a chemical stimulus. In one or more embodiments, the chemical stimulus for chemotaxis is a hydrocarbon concentration gradient. As a response to environmental stimuli, in this instance a hydrocarbon concentration gradient food source, the bacteria may move autonomously toward the hydrocarbons.

Thus, extremophilic bacteria combining both the metal-silica nanoparticles and the chemotaxis machinery may be injected into a reservoir, move autonomously to oil residing in the reservoir to serve as a food source, and grow with enhanced biosurfactant production due to the presence of the metal-silica nanoparticles. Upon the bacteria reaching log phase growth, cell lysis may be triggered, such as by introducing a subsequent amount of metal-silica nanoparticles downhole, thereby releasing the biosurfactants into the reservoir, adjacent the oil trapped therein.

Methods

Conventional improved or enhanced oil recovery is accomplished by delivering surfactants to the oil phase of current and mature oil fields to change the wettability of the rock surface and interfacial tension between an oil phase and aqueous phase. The present disclosure is directed to bacteria mediated enhanced oil recovery, a type of microbial EOR, allows for the production of surfactants in situ from bacteria rather than injecting surfactants at the surface.

Thus, improvements in hydrocarbon recovery efficiency of one or more embodiments are made by replacing synthetic surfactants that are injected into the reservoir with natural surfactants produced in situ that are target-delivered to the oil trapped in the reservoir. The methods presented in one or more embodiments are envisioned to be sustainable. Sustainable methods may include the utilization of native extremophile strains (either natural or genetically modified) that are available and able to grow under harsh reservoir conditions, and may further include minimizing the use of toxic chemicals and other EOR approaches that cause carbon emissions compared to the biological approach.

In accordance with one or more embodiments, the surface-modified extremophilic bacteria with metal-silica nanoparticles attached thereto are added to a treatment solution to be injected downhole. Concentration ranges of bacteria in the treatment solution may be dependent on the bacterial species used. As a non-limiting example of an injection fluid composition according to one or more embodiments, about $6 \times 10^{12}$ cells were used in an injection fluid preparation, including about 80,000 L of cells and nutrients, for two *Bacillus* species (sp.): *B. licheniformis* and *B. subtilis*. This equates to a microbial density of about $7.5 \times 10^4$ cells/mL in the injection fluid. In another non-limiting example, a mixture of different bacterial species such as *Arthrobacter* sp. and *Pseudomonas* sp. were injected in an oil reservoir with a volume of 210 cubic meters ($m^3$), at a microbial density of $1.8$~$2.4 \times 10^7$ cells per milliliter (cells/mL). In one or more embodiments, a minimum concentration range for extremophilic bacteria growth in the reservoir is 0.5 grams per liter (g/L) up to 10 g/L. In one or more embodiments, the maximum concentration range for extremophilic bacteria in the reservoir before lysis is from 10 g/L to 100 g/L.

In one or more embodiments, nutrients are added with the bioengineered extremophilic bacteria in addition to a metal, such as iron (or an iron source). When the food source is only hydrocarbons, it may not be necessary to add an additional food source. When the food source is a carbon source such as sugar (like glucose, maltose, sucrose, and molasses) or vegetable oil (like palm oil and olive oil), the food source may be added as an additional element to the metal-silica nanoparticles. A nitrogen source (like yeast extract, urea, peptone, ammonium sulphate, ammonium nitrate, sodium nitrate, meat extracts, and malt extracts), salts, and trace essential metals ($Mn^{2+}$, $CaCl_2$, $ZnSO_4$, $MnSO_4$, nitrate salt, magnesium salt, $NaNO_3$, $MgSO_4$) may also be included as an additional element to the metal-silica nanoparticles.

Biosurfactants released from the bacteria enable advantageous effects relating to oil recovery, including lowering or reducing interfacial tension (IFT) between oil and water, altering rock wettability, and in turn increasing the capillary number and mobilization of remaining oil. Unlike traditional methods, the bioengineered extremophilic bacteria including chemotaxis mechanisms allow a targeted delivery of bacteria and the biosurfactants that they produce to parts of the reservoir that would not otherwise be reached by chemical surfactants. Moreover, when the bioengineered extremophilic bacteria reaches the trapped oil, it will produce more biosurfactant directly to be released near the oil, compared to an extremophilic bacteria without chemotaxis mechanisms. These effects lead to an increase in the mobility of the trapped or heavy oil. In one or more embodiments, mobilization of remaining oil with extremophilic bacteria occurs in one or more of oil-wet, neutral-wet, and water-wet conditions.

Biosurfactant production and extremophilic bacterial growth in the reservoir may be controlled by cell death via cell lysing. Cell lysing may occur by introduction of metal ions, for example, via metal-silica-nanoparticles, into the reservoir after period where the bacteria have been allowed to grow (and produce biosurfactants) in the reservoir. When the extremophilic bacterial cells are lysed, they rupture due to a high concentration of metal ions and decompose into organic matter. As cells lyse, they release further biosurfactants, which increase the yield of enhanced and improved oil recovery applications compared to unlysed cells. Biosurfactants that are released by extremophilic bacteria are robust and efficient under harsh reservoir conditions, as compared to common surfactants and biosurfactants released by non-extremophilic bacteria. In one or more embodiments, lysing of bacterial cells reduces overpopulation and clogging, providing a method against biofouling in the well bore or reservoir. The step of cell lysing allows for reduced consumption of hydrocarbons and control over the life cycle of the extremophilic bacteria. In addition, the methods are cost-effective and less harmful to the environment than other recovery methods. Methods that are less harmful to the environment generally relate to biocompatibility, biodegradability, and low toxicity of the metals used (compared to other metals) in one or more embodiments of the present disclosure.

As presented in aforementioned embodiments, Fe—Si—NP or similar metal-silica-nanoparticles are attached to extremophilic bacteria for the purpose of enhanced biosurfactant production and bacterial growth control downhole in the reservoir. These methods allow autonomous and stimuli-responsive carriers (bacteria) that specifically target trapped oil. Thus, utilizing biosurfactants that are replenished through bacterial growth EOR to mobilize trapped oil. In addition, this approach controls bacterial growth downhole with metal-silica-nanoparticles, whereby the bacterial cells rupture when their growth is increased to above a concentration in order to avoid clogging of oil and water paths downhole. The growth increase beyond a concentration generally is measured by an end or near-end of the log (exponential) growth phase. In one or more embodiments, when the log phase growth begins to plateau, cell death mechanisms are triggered with metal-silica nanoparticle solution.

In one or more embodiments, the extremophilic bacteria may be bacterial species from local extreme environments, as candidates that survive and tolerate local reservoir conditions. Thus, local resources are utilized for targeted delivery, and accumulation of extremophilic bacteria on trapped hydrocarbons. In one or more embodiments, biofilm formation is avoided to prevent reservoir clogging. Biofilm formation may be avoided by the increased iron concentrations released from the metal-silica nanoparticles, which may cause cell death and lysis before reaching the phase of biofilm formation (beyond the log phase of growth).

The extremophilic bacteria may be natural or genetically engineered to accept hydrocarbons as a sole carbon food source downhole. Thus, the extremophilic bacteria are efficiently targeted toward trapped oil in the reservoir. When the oil reservoir is treated with these extremophilic bacteria, their ability to trap oil will be higher than bacteria that are not equipped with a chemotaxis mechanism of mobility. An increase in bacterial growth due to the surface attached iron-silica-nanoparticles allows for growth and a subsequent step of introducing a separate iron-nanosilica solution that leads to the lysis of bacterial cells. Upon cell lysis, biosurfactants are released resulting in their increased yield. In one or more embodiments, biosurfactants that are released include, but are not limited to, one or more of rhamnolipids, glycolipids, lipopeptides, exopolysaccharides, glycopeptides, glycolipids, phospholipids, or ornithine lipids. One or more mechanistic embodiments allow bacterial growth control downhole and enhanced yield of biosurfactants by targeting log phase growth.

The biosurfactants produced by the extremophilic bacteria may be used in upstream applications such as enhanced oil recovery (EOR), microbiologically influenced corrosion control, and biofouling treatment. One or more embodiments herein relate to microbial enhanced EOR with a treatment to prevent microbial biofouling.

As mentioned above, additional metal supplement of metal-silica nanoparticles may be added after injection of the extremophilic bacteria to inhibit bacterial over-growth downhole. An injection downhole may be a water injection. A first injection may include the extremophilic bacteria having the nanoparticles. The attached metal-silica nanoparticles will aid biosurfactant production in-situ when the extremophilic bacteria arrive at the trapped oil. A second injection may be for oil production. Oil recovery is subsequently enhanced through biosurfactant production, while the second quantity of injected metal-silica nanoparticles (unattached to bacteria) will inhibit bacterial growth to avoid downhole clogging.

Unless defined otherwise, all technical and scientific terms used have the same meaning as commonly understood by one of ordinary skill in the art to which these systems, apparatuses, methods, processes and compositions belong.

The singular forms "a," "an," and "the" include plural referents, unless the context clearly dictates otherwise.

As used here and in the appended claims, the words "comprise," "has," and "include" and all grammatical variations thereof are each intended to have an open, non-limiting meaning that does not exclude additional elements or steps.

"Optionally" means that the subsequently described event or circumstances may or may not occur. The description includes instances where the event or circumstance occurs and instances where it does not occur.

When the word "approximately" or "about" are used, this term may mean that there can be a variance in value of up to ±10%, of up to 5%, of up to 2%, of up to 1%, of up to 0.5%, of up to 0.1%, or up to 0.01%.

The term "substantially" as used refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Ranges may be expressed as from about one particular value to about another particular value, inclusive. When such a range is expressed, it is to be understood that another embodiment is from the one particular value to the other particular value, along with all particular values and combinations thereof within the range.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. It is the express intention of the applicant not to invoke 35 U.S.C. § 112(f) for any limitations of any of the claims herein, except for those in which the claim expressly uses the words 'means for' together with an associated function.

What is claimed is:

1. A composition, comprising:
    an aqueous phase; and
    extremophilic bacteria having signal transduction chemotaxis machinery that is a two-component system with active-selective movement configured to be selective toward a hydrocarbon food source and nanoemulsion oil droplets including metal-silica nanoparticles attached to a surface thereof by one or more selected from the group consisting of electrostatic attachment, hydrophobicity binding, chemical binding, and slime adhesion;
    wherein the extremophilic bacteria produce biosurfactants;
    wherein the signal transduction chemotaxis machinery responds to the hydrocarbon food source; and
    wherein the metal-silica nanoparticles are mesoporous.

2. The composition of claim 1, wherein the extremophilic bacteria have non-naturally occurring signal transduction chemotaxis machinery.

3. The composition of claim 1, wherein the metal-silica nanoparticles are iron-silica nanoparticles.

4. The composition of claim 1, wherein the extremophilic bacteria have an overall negative surface charge on cell surfaces.

5. The composition of claim 4, wherein the extremophilic bacteria is one or more selected from the group consisting of Gram-positive, Gram-negative, Gram-variable, and acid-fast bacteria.

6. The composition of claim 5, wherein the extremophilic bacteria is one or more Gram-positive bacteria selected from the group consisting of: *Arthrobacter calcoacetiens*, *Bacillus subtilis*, *Bacillus licheniformis*, *Bacillus mojavensis*, *Bacillus firmus*, *Bacillus halodurans*, *Bacillus mycoides*, *Bacillus stearothermophilus*, *Brevibacterium brevis*, *Corynebacterium insidibasseosum*, *Rhodococcus erythropolis*, *Thermoanaerobacter pseudethanolicus*, *Thermoanaerobacter ethanolicus*, *Virgibacillus salaries*, and genus *Nocardiopsis*.

7. The composition of claim 5, wherein the extremophilic bacteria are one or more Gram-variable bacteria with Gram-positive characteristics, selected from the group consisting of: *Methanobacterium*, *Paenibacillus alvei*, and *Paenibacillus ehimensis*.

8. The composition of claim 5, wherein the extremophilic bacteria is one or more Gram-negative bacteria selected from the group consisting of: *Acinetobacter calcoaceticus*, *Acinetobacter radioresistens*, *Alcanivorax borkumensis*, *Enterobacter aerogens*, *Enterobacter cloacae*, *Methylococcus capsulatus*, *Pseudomonas aeruginosa*, *Pseudomonas stutzeri*, *Pseudomonas putida*, *Pyrobaculum aerophilum*, *Rhizobium radiobacter*, *Thalassolituus oleivorans*, *Xanthomonas campestris*, and genus *Serratia*.

9. The composition of claim 5, wherein the extremophilic bacteria is the acid-fast bacteria from a genus *Mycobacterium*.

10. The composition of claim 5, further comprising metal-silica nanoparticles unattached to the extremophilic bacteria.

11. A method for treating an oil reservoir, comprising:
    introducing into the oil reservoir an extremophilic bacteria having signal transduction chemotaxis machinery that is a two-component system with active-selective movement configured to be selective toward a hydrocarbon food source and nanoemulsion oil droplets including metal-silica nanoparticles attached to a surface thereof by one or more selected from the group consisting of electrostatic attachment, hydrophobicity binding, chemical binding, and slime adhesion,
    wherein the metal-silica nanoparticles are mesoporous.

12. The method of claim 11, further comprising:
    introducing a metal-silica nanoparticle solution downhole, whereupon the extremophilic bacteria are lysed.

13. The method of claim 11, wherein the extremophilic bacteria have non-naturally occurring signal transduction chemotaxis machinery.

14. A method for bacteria mediated enhanced oil recovery, comprising:
    attaching nanoemulsion oil droplets including metal-silica nanoparticles to the surface of extremophilic bacteria by one or more selected from the group consisting of electrostatic attachment, hydrophobicity binding, chemical binding, and slime adhesion,
    wherein the metal-silica nanoparticles are mesoporous,
    introducing the extremophilic bacteria downhole to an oil reservoir,
    allowing the extremophilic bacteria to be delivered to a hydrocarbon food source in the oil reservoir via a chemotaxis mechanism of mobility that is a two-component system with active-selective movement configured to be selective toward a hydrocarbon food source,
    wherein bacterial growth occurs upon reaching the hydrocarbon food source,
    triggering cell lysis of the extremophilic bacteria to occur, whereupon biosurfactants are released from lysed extremophilic bacteria, thereby trapping oil from the oil reservoir with the biosurfactants,
    mobilizing the oil trapped by the biosurfactants away from porous rock; and producing the oil trapped by the biosurfactants from the oil reservoir.

15. The method of claim 14, wherein the extremophilic bacteria do have non-naturally occurring chemotaxis mechanism of mobility.

16. The method of claim 14, wherein the cell lysis of the extremophilic bacteria occurs upon introducing a metal-silica nanoparticle solution downhole to the oil reservoir.

17. The method of claim 14, wherein the cell lysis of the extremophilic bacteria occurs during a log phase.

18. The method of claim 14, wherein the cell lysis is triggered by an addition of a metal-silica nanoparticle solution.

19. The method of claim 14, wherein the hydrocarbon food source is the oil trapped within the oil reservoir.

20. The method of claim 19, wherein the hydrocarbon food source that is the oil trapped within the oil reservoir is blocked from being ingested by the extremophilic bacteria.

21. The method of claim 14, wherein a separate hydrocarbon food source is included in metal-silica nanoparticles.

* * * * *